United States Patent
Bachman

[11] 3,767,977
[45] Oct. 23, 1973

[54] ELECTRIC DISTRIBUTION PANEL HAVING EXTRUDED BUSES AND CONTACT STABS

[75] Inventor: Anatole Bachman, Willowdale, Ontario, Canada

[73] Assignee: I-T-E Circuit Breaker (Canada) Limited, Mississauga, Ontario, Canada

[22] Filed: Apr. 17, 1972

[21] Appl. No.: 244,674

[52] U.S. Cl. ............................. 317/119, 174/72 B
[51] Int. Cl. .............................................. H02b 1/20
[58] Field of Search ............... 174/70 B, 71 B, 72 B; 317/119

[56] References Cited
UNITED STATES PATENTS

| | | | |
|---|---|---|---|
| 3,402,328 | 9/1968 | Grystko | 317/119 |
| 3,375,411 | 3/1968 | Mrowka | 317/119 |
| 3,333,157 | 7/1967 | Stokes | 317/119 |
| 3,588,620 | 6/1971 | Wasileski | 174/72 B |

*Primary Examiner*—Robert K. Schaeffer
*Assistant Examiner*—Gerald P. Tolin
*Attorney*—Ostrolenk, Faber, Gerb & Soffen

[57] ABSTRACT

A panelboard for use with plug-in type circuit breakers is constructed with extruded main bus bars having integrally formed male stabs for the electrical connection of the circuit breakers. The bus bars are mounted to the rear of an insulating base, and the stabs extend through aperture means in the base to a position forward thereof. Mounting rails for locating and mechanically securing the circuit breakers are mounted along opposite sides of the insulating base, and a common fastening means operatively secures the locating rails to the insulating base and secured the insulating base to the rear wall of the panelboard enclosure.

8 Claims, 12 Drawing Figures

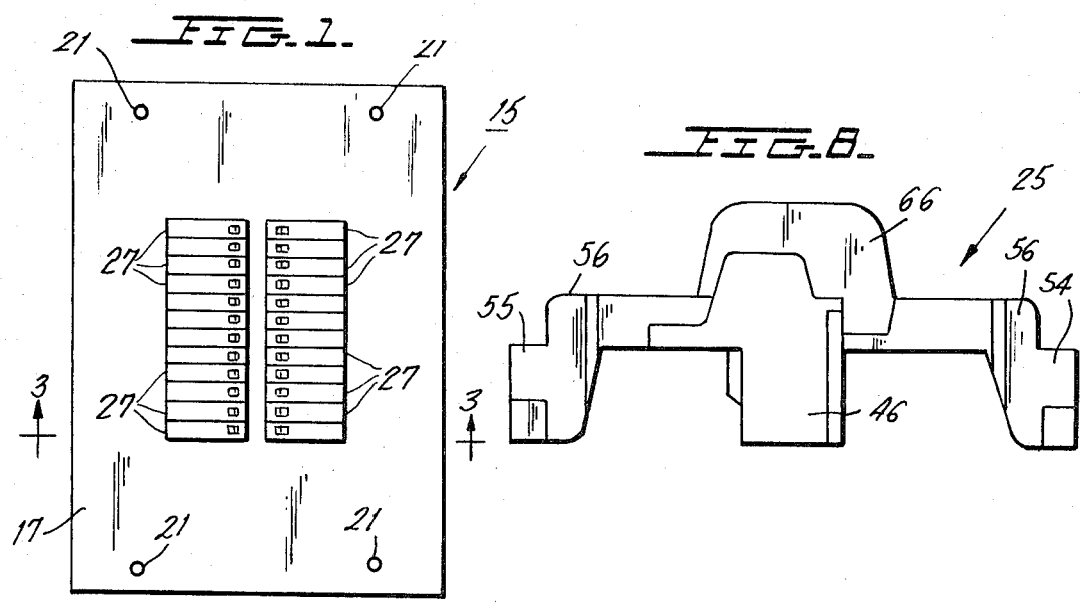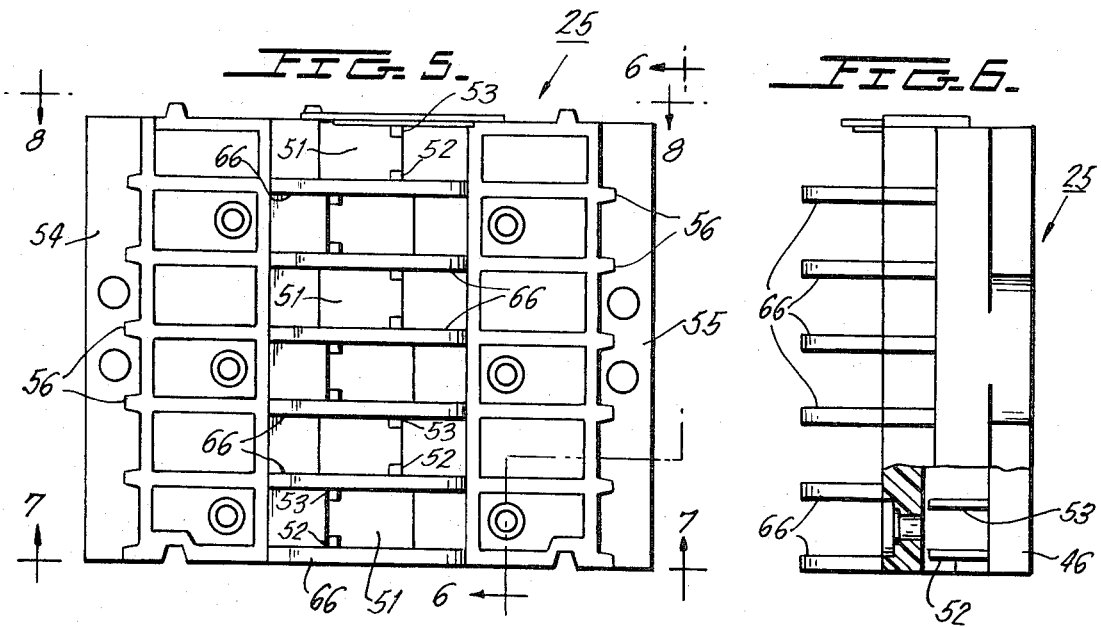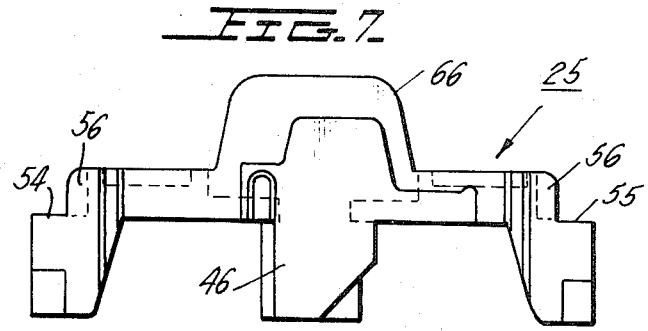

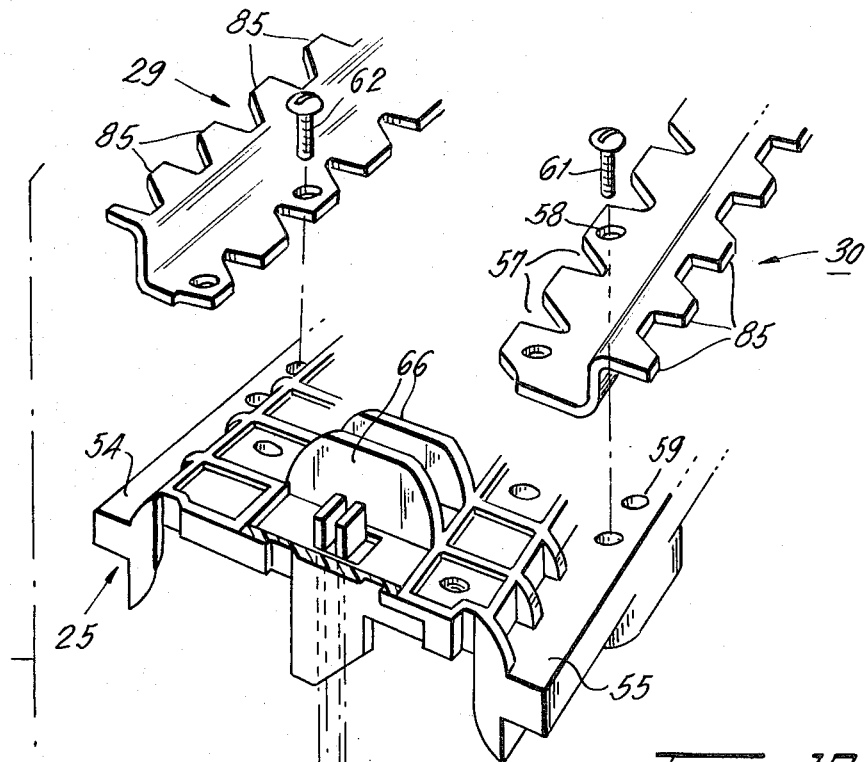
FIG. 10.
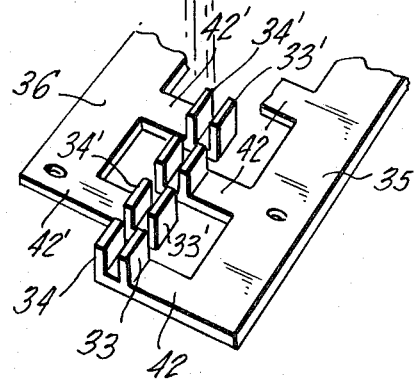
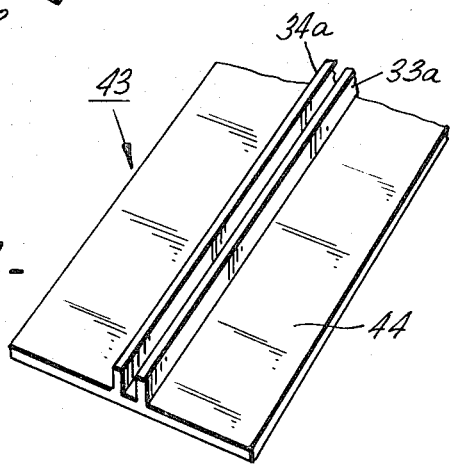
FIG. 11.

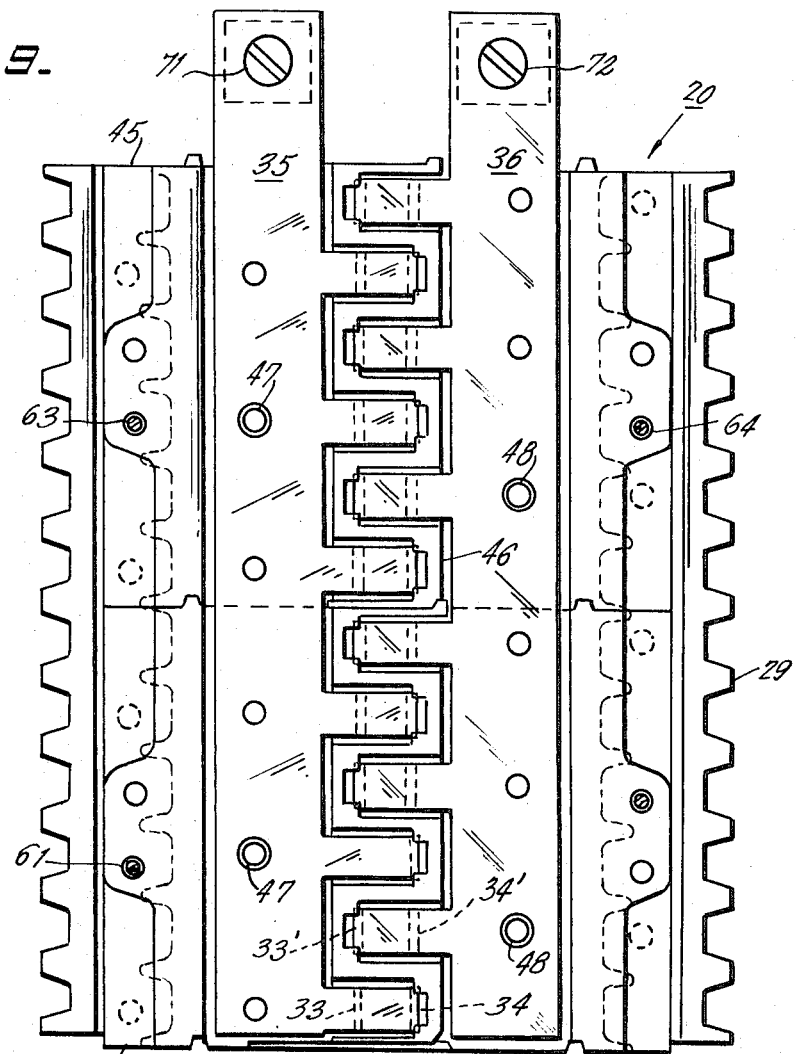
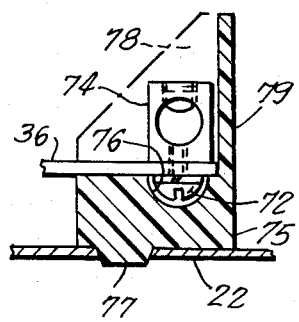
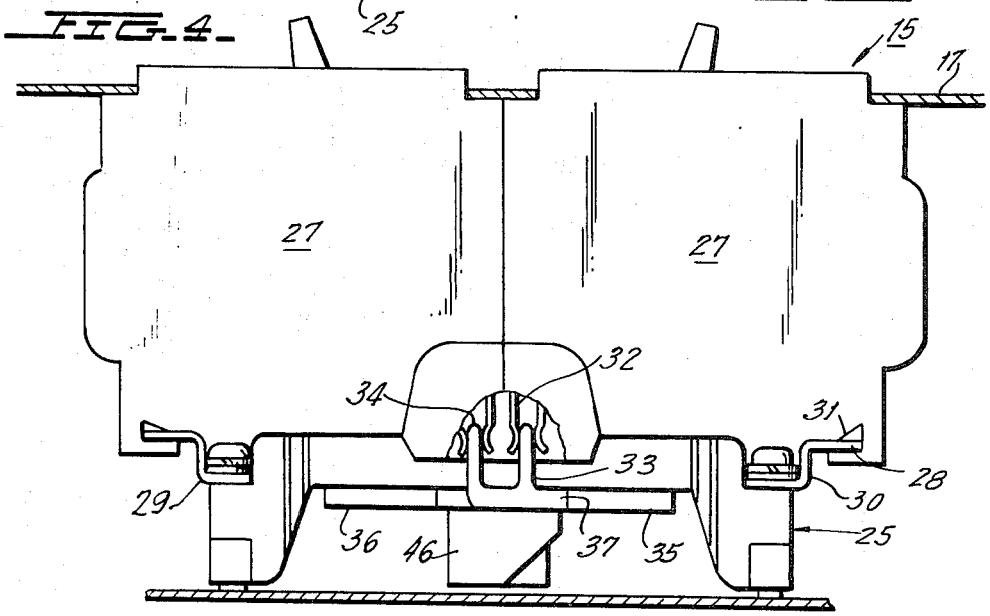

ELECTRIC DISTRIBUTION PANEL HAVING EXTRUDED BUSES AND CONTACT STABS

This invention relates to panelboards in general and more particularly relates to a novel panelboard having integrally formed extruded bus bars and plug-in stabs.

For home and light industrial applications circuit breakers having plug-in or friction type connections to a panelboard energizing means are becoming increasingly popular over those circuit breakers which require bolted connections to the energizing means. Possibly the most popular panelboards for plug-in circuit breakers utilize a plurality of plate-like male stabs aligned in a row in face-to-face relation. Thus, each stab is in a plane perpendicular to the plane of its connected bus bar and perpendicular to the longitudinal axis of this bus bar. Because of this orientation of the stabs relative to the bus bars, a number of bending operations are required and some constructions require undesirable bolted connections between the bus bars and the stabs.

In accordance with the instant invention the stabs, although at right angles to the plane of the bus bars, are planar elements located in planes parallel to the longitudinal axes of the main conductors. Because of this the stabs and bus bars are cut from a single extrusion and no bolted connections are required between the stabs and bus bars. The bus bars are permanently secured to a slab-like insulating base at the rear thereof, and the assembly is mounted to the rear wall of a metal enclosure by a common fastening means which also mounts the circuit breaker locating and mechanical securement rails to the insulating base. The main terminal lugs are insulated from one another by a barrier formation of an insulated block, with the latter being captured in operative position by the means fastening the lugs to their associated bus bars and a rear projection from the block extending into a cooperating aperture in the enclosure wall.

Accordingly, a primary object of the instant invention is to provide a novel construction for a panelboard having a reduced number of components.

Another object is to provide a panelboard of this type having a reduced number of electrical joints.

Still another object is to provide a panelboard having a novel arrangement of plug-in stabs.

A further object is to provide a panelboard having integrally formed bus bars and stabs produced from an extrusion.

These objects as well as other objects of this invention will become readily apparent after reading the following description of the accompanying drawings in which:

FIG. 1 is a front elevation of a panelboard constructed in accordance with teachings of the instant invention.

FIG. 4 is an enlarged partially sectioned fragmentary portion of FIG. 3.

FIG. 5 is a front elevation of one of the insulators of the main bus bars.

FIG. 6 is a side elevation, partially sectioned, taken through line 6—6 of FIG. 5 and looking in the direction of arrows 6—6.

FIGS. 7 and 8 are end views of the insulator of FIG. 5, looking in the directions of the respective arrows 7—7 and 8—8.

FIG. 9 is a rear elevation of the main bus conductors, their insulators, and the circuit breaker locating and mounting rails.

FIG. 10 is an exploded perspective showing fragmentary portions of the elements of FIG. 9.

FIG. 11 is a perspective showing a fragmentary portion of the extrusion from which both main conductors are cut.

Figure 2:
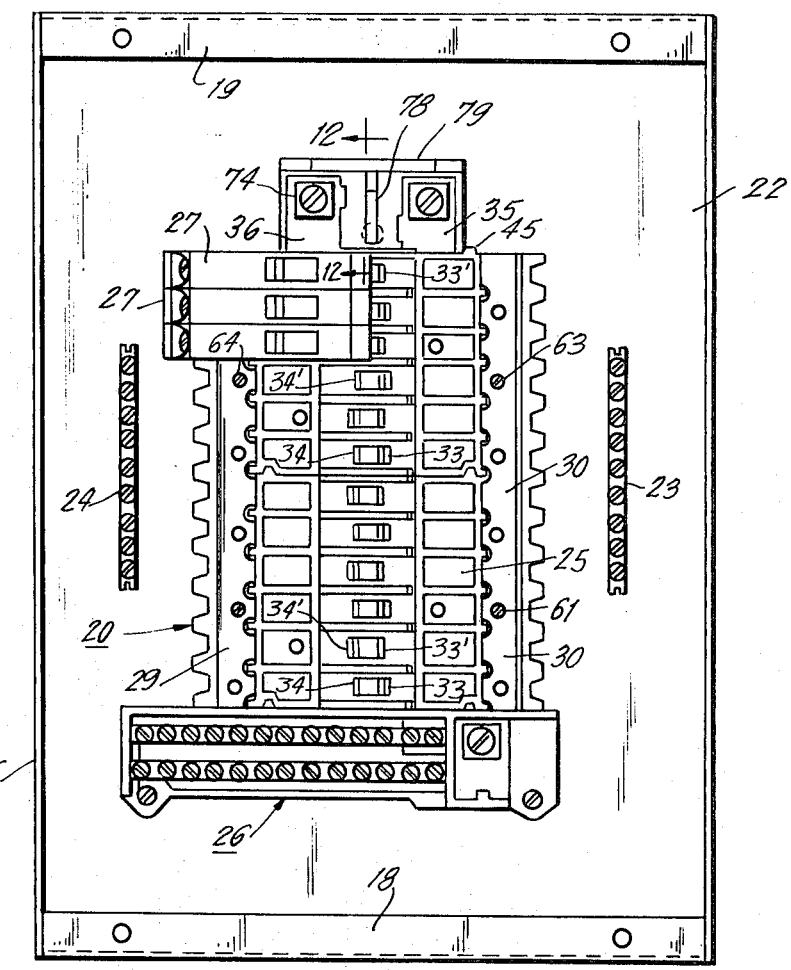
FIG. 2 is an enlarged front elevation of the panelboard of FIG. 1 with the face plate and most of the circuit breakers removed.
Figure 3:
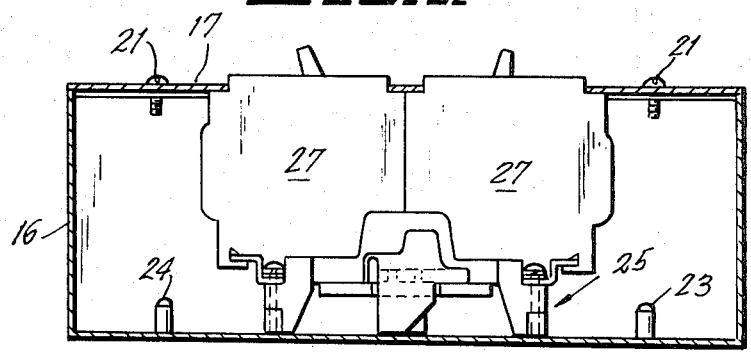
FIG. 3 is a cross-section taken through line 3—3 of FIG. 1, looking in the direction of arrows 3—3.

FIG. 12 is a cross-section taken through line 12—12 of FIG. 2, looking in the direction of arrows 12—12.

Now referring to the figures and more particularly to FIGS. 1–4. Panelboard 15 includes pan-like enclosure 16 having a front opening which, for the most part, is enclosed by face plate 17 secured, inwardly turned, to enclosure lips 18, 19 by screws 21. Disposed within enclosure 16 and secured to rear wall 22 thereof are grounding bars 23, 24, neutral bar assembly 26, and energizing assembly 20. A plurality of circuit breakers 27 are mounted to assembly 20 by having outboard locating and securing projections 28 on the forward legs of mounting rails 29, 30 entered into recesses 31 at the load end of each circuit breaker 27 and by having each circuit breaker line terminal jaw 32 in frictional engagement with a forwardly extending stab 33 or 34 integrally formed with main conductor 35 or stab 33′ or 34′ integrally formed with main conductor 36.

As best seen in FIG. 10 main conductor 35 is provided with a plurality of longitudinally spaced lateral projections 42 disposed in the same plane as conductor 35. Each extension 42 is provided with a pair of forwardly extending stabs 33, 34 disposed in laterally spaced parallel planes that are parallel to the longitudinal axis of conductor 35 and perpendicular to the plane of conductor 35. All of the stabs 33 are located in the same plane, and all of the stabs 34 are located in another plane. Similarly, the other main conductor 36 is provided with a plurality of longitudinally spaced lateral extensions 42′ disposed in the same plane as the plane of main conductor 36. Each extension 42′ is provided with a pair of stabs 33′, 34′ projecting forward and at right angles to the plane of main conductor 36. All of the stabs 33′ are located in the same plane as stabs 33, and all of the stabs 34′ are located in the same plane as stabs 34.

Because of the similarity in shape between main conductors 35, 36 and the conducting formations integral therewith, both of these conducting elements are punched from the single extrusion 43 of FIG. 11. Extrusion 43 includes elongated planar base 44 having longitudinally extending ribs 33a, 34a projecting forward and at right angles to base 44. Ribs 33a, 34a are closely spaced and positioned on opposite sides of the longitudinal axis for base 44.

Main conductors 35, 36 are disposed within suitable recesses of insulating base 25 at the rear thereof, with such recesses being separated by zig-zag formation 46, which is shaped to provide barriers between lateral extensions 42 and 42′. Insulator 25 is positioned end to end in abutting relationship with an identical insulator 45. Both of these insulators 25, 45 are secured to main conductor 35 by rivets 47, 47 and to main conductor 36 by rivets 48, 48 to maintain conductors 35, 36 in spaced parallel relationship in a common plate.

Stabs 33, 34, 33', 34' extend through apertures 51 thereof so as to be engageable from the front of assembly 14. The rear surfaces of lateral extensions 42, 42', at the ends thereof having stabs 33, 34, 33', 34', are backed up by the forward ends of insulator formations 52, 53, with a pair of these formations 52, 53 being located in adjacent corners of each insulator aperture 51. Ledges 54, 55 at the front of insulator 25 support the rear legs of mounting rails 29, 30 respectively. Rails 29, 30 are positioned longitudinally by cooperation between insulator projections 56 and rail notches 57. Apertures 58, 59 in rail 30 and insulator 25, respectively, receive common fastening screw 61 that extends into a threaded aperture (not shown) in enclosure wall 22 for fastening rail 32 to insulator 25 and for fastening assembly 20 to enclosure 16. Similarly, common fastening screw 62 secures rail 29 to insulator 25 and secures assembly 20 to enclosure 16. Common fastening screws 63, 64 secure the respective rails 30, 29 to insulator 45 and additionally secure assembly 20 to enclosure 16. Forwardly extending insulating barriers 66 of both insulators 25 and 45 are interposed between each set of stabs 33', 34' and the adjacent sets of stabs 33, 34 to provide a barrier between adjacent sets of stabs and between line terminal 32 of each circuit breaker 27 and the line terminals of circuit breakers on each side thereof.

Screws 71, 72 secure wire grips 73, 74, respectively, to the ends of conductors 35, 36, respectively, at the ends thereof remote from neutral assembly 26. The head of screw 72 is disposed within recess 76 in insulating block 75 positioned adjacent to the upper end of insulator 45, with conductor 36 resting on the forward surface of insulator 75 to prevent forward movement thereof. The head of screw 71 extends into a similar recess (not shown) in conductor 35. Projection 77 at the rear of insulator 75 extends into a complementary aperture of enclosure wall 22 to operatively position insulator 75 within enclosure 60. Forwardly extending wall 78 of insulator 75 is positioned between wire grips 73, 74 to form an insulating barrier therebetween. Wall 79, extending forward from insulator 75 and perpendicular to wall 78, also provides an insulating barrier between wire grips 73, 74.

Thus, it is seen that the instant invention provides a novel construction for a panelboard having relatively few parts and which is relatively free of screw and rivet type connections. In addition, the main bus bars and line terminal stabs are integrally formed from an extruded element.

Although there has been described a preferred embodiment of this novel invention, many variations and modifications will now be apparent to those skilled in the art. Therefore, this invention is to be limited not by the specific disclosure herein but only by the appending claims.

The embodiments of the invention in which an exclusive privilege or property is claimed are defined as follows:

1. A panelboard including first and second generally flat main conductors insulated from one another and disposed in generally parallel planes; a first plurality of generally planar circuit breaker energizing stabs aligned in a first row and disposed in a first plane; a second plurality of generally planar circuit breaker energizing stabs aligned in a second row and disposed in a second plane generally parallel to said first plane; said first and second planes extending between said main conductors, generally parallel to the longitudinal axes thereof and generally perpendicular to the planes thereof; said first main conductor having a first plurality of longitudinally spaced lateral extensions projecting toward said second main conductor and the latter having a second plurality of longitudinally spaced lateral extensions projecting toward said first main conductor; each of said extensions, at the end thereof remote from its connected main conductor, mounting a stab of said first row and a stab of said second row; said first main conductor being formed integrally by extrusion with its said extensions and those of said stabs mounted to these extensions; said second main conductor being formed integrally by extrusion with its said extensions and those of said stabs mounted to these extensions; insulating means to which said main conductors are secured at the rear thereof, a housing wherein said main conductors and said insulating means are disposed; means securing said insulating means to a rear wall of said housing; first and second main lugs; fastening means securing said first and second main lugs to the respective first and second main conductors; an insulating member having a main portion positioned in front of said wall and interposed between said main lugs and said wall; said insulating member also having a barrier interposed between said main lugs; said insulating member being retained in its operative position by a rearward extension of said main portion entered into a cooperating aperture in said wall and positioning of said main conductors in front of said main portion blocking forward movement of said rearward extension out of said cooperating aperture.

2. A panelboard as set forth in claim 1 in which the stabs mounted on the extensions of said first main conductor are interposed between the stabs mounted on the extensions of said second main conductor.

3. A panelboard as set forth in claim 2 in which the insulating means to which said main conductors are secured is of slab-like configuration; said insulating means including apertures through which said stabs project for engagement by circuit breakers mounted in front of said insulating means.

4. A panelboard as set forth in claim 3 in which the insulating means is provided with forwardly extending barrier means interposed between the stabs mounted on the extensions of the first main conductor and the stabs mounted on the extensions of the second main conductor.

5. A panelboard as set forth in claim 3 in which both said first and said second planes extend through each of said apertures.

6. A panelboard as set forth in claim 1 also including locating means for positioning circuit breakers along the length of said main conductors; common fastening means mechanically securing said locating means to said insulating means as well as securing said insulating means to said housing in operative positions.

7. A panelboard as set forth in claim 6 in which said locating means includes a first plurality of locating projections extending from a first strip positioned on the side of said first main conductor remote from said stabs; said locating means also including a second plurality of locating projections extending from a second strip positioned on the side of said main conductor remote from said stabs; said projections extending away from said stabs.

8. A panelboard as set forth in claim 2 in which the first main conductor is constructed so that a first transverse cross-section thereof extending through an extension thereof and stabs mounted to this extension is substantially identical to a second transverse cross-section of said second main conductor extending through an extension thereof and stabs mounted to this extension.

* * * * *